(12) United States Patent
Kim et al.

(10) Patent No.: US 11,774,307 B2
(45) Date of Patent: Oct. 3, 2023

(54) FOOT STRUCTURE FOR WALKING ROBOT, WALKING ROBOT INCLUDING FOOT STRUCTURE, AND METHOD OF OPERATING WALKING ROBOT

(71) Applicants: HYUNDAI MOTOR COMPANY, Seoul (KR); KIA CORPORATION, Seoul (KR)

(72) Inventors: Beom Su Kim, Yongin-si (KR); Hyun Seop Lim, Anyang-si (KR); Sang In Park, Suwon-si (KR); Ju Young Yoon, Suwon-si (KR); Dong Hyun Lee, Uiwang-si (KR); Dong Jin Hyun, Suwon-si (KR); Hyo Seung Han, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 316 days.

(21) Appl. No.: 17/241,779

(22) Filed: Apr. 27, 2021

(65) Prior Publication Data
US 2022/0105623 A1 Apr. 7, 2022

(30) Foreign Application Priority Data
Oct. 5, 2020 (KR) .......................... 10-2020-0128300

(51) Int. Cl.
*B25J 9/14* (2006.01)
*G01L 7/00* (2006.01)

(52) U.S. Cl.
CPC ...................................... *G01L 7/00* (2013.01)

(58) Field of Classification Search
CPC ....... G01L 7/00; B25J 19/0091; B25J 13/081; B25J 9/0006; B25J 9/0009; B25J 9/14; B25J 19/02; B62D 57/032
See application file for complete search history.

(56) References Cited

U.S. PATENT DOCUMENTS

| 9,499,219 | B1* | 11/2016 | Jackowski | ............ B25J 9/1694 |
| 10,220,518 | B2* | 3/2019 | Jackowski | ............ B25J 9/1694 |
| 11,192,261 | B2* | 12/2021 | Jackowski | ........... B62D 57/032 |
| 2017/0036352 | A1 | 2/2017 | Jackowski et al. | |
| 2019/0143531 | A1* | 5/2019 | Jackowski | ............ B25J 9/1694 700/258 |

\* cited by examiner

*Primary Examiner* — Freddie Kirkland, III
(74) *Attorney, Agent, or Firm* — MCDONNELL BOEHNEN HULBERT & BERGHOFF LLP

(57) ABSTRACT

One aspect of the present disclosure provides a foot structure for a walking robot including a link configured to define a body, a buffer unit coupled to one end portion of the link and having a vacant space formed therein, and a pressure sensor provided in the link and configured to detect a change in pressure of air in the vacant space in the buffer unit.

16 Claims, 2 Drawing Sheets

FOOT STRUCTURE FOR WALKING ROBOT, WALKING ROBOT INCLUDING FOOT STRUCTURE, AND METHOD OF OPERATING WALKING ROBOT

CROSS REFERENCE TO RELATED APPLICATIONS

This application claims priority to and the benefit of Korean Patent Application No. 10-2020-0128300 filed in the Korean Intellectual Property Office on Oct. 5, 2020, the entire contents of which are incorporated herein by reference.

TECHNICAL FIELD

The present disclosure relates to a foot structure for a walking robot, a walking robot including the foot structure, and a method of operating the walking robot, and more particularly, to a foot structure for a walking robot, which has a sensor capable of detecting a pressure of a ground surface applied to the foot structure, and a walking robot including the foot structure, and a method of operating the walking robot.

BACKGROUND

Various types of robots are used in the technical fields, and examples of the robots may include a walking robot. In particular, the walking robot is specialized to perform functions such as service, and delivery of objects, and recently, research is being conducted on various types of walking robots.

The structure of the walking robot varies depending on the function of the walking robot. The walking robot generally includes a body configured to define a body of the walking robot, and a foot structure coupled to one side of the body and having a shape extending downward.

The foot structure provided in the walking robot is sometimes embedded with a pressure sensor for detecting contact between the foot structure and a ground surface or other objects.

However, in the related art, impact is applied to the foot structure and the pressure sensor during a process in which the foot structure comes into contact with the ground surface or the object, which causes a problem of deterioration in durability of the foot structure and the pressure sensor.

In addition, in the related art, when there is a pressure difference between an internal pressure and an external pressure of the foot structure, the pressure sensor detects a change in pressure with different numerical values even in a case in which the same external impact is applied. As a result, constant performance cannot be ensured.

SUMMARY

An object of the present disclosure is to protect a pressure sensor mounted in a walking robot from external impact, thereby improving durability of the pressure sensor.

Another object of the present disclosure is to quickly remove a pressure difference when the pressure difference occurs between an internal pressure and an external pressure of a foot structure, thereby ensuring constant performance despite a change in pressure.

In order to achieve the above-mentioned objects, a first aspect of the present disclosure provides a foot structure for a walking robot, the foot structure including a link configured to define a body, a buffer unit coupled to one end portion of the link and having a vacant space formed therein, and a pressure sensor provided in the link and configured to detect a change in pressure of air in the vacant space in the buffer unit.

The foot structure may further include a first tube provided in the link and communicating with the vacant space in the buffer unit, in which the pressure sensor is connected to one end portion of the first tube.

The foot structure may further include a first valve provided in the link; and a second tube diverging from the first tube and having one end portion connected to the first valve.

The foot structure may further include a second valve provided in the link; and a third tube diverging from the second tube and having one end portion connected to the second valve.

The foot structure may further include a first connection unit provided in a region in which the second tube diverges from the first tube, in which the first connection unit is provided to surround an outer portion of the first tube and an outer portion of the second tube.

The foot structure may further include a second connection unit provided in a region in which the third tube diverges from the second tube, in which the second connection unit is provided to surround the outer portion of the second tube and an outer portion of the third tube.

The first valve may be a check valve.

The second valve may be an openable/closable bidirectional valve.

A length of the first tube within a region between the first connection unit and the pressure sensor may be shorter than a length of the second tube within a region between the first connection unit and the first valve.

A length of the second tube within a region between the second connection unit and the first valve may be shorter than a length of the third tube within a region between the second connection unit and the second valve.

The check valve may allow the air to flow into the link from the outside of the link and prevent the air from flowing to the outside of the link from the inside of the link.

The pressure sensor may be inserted and coupled into the buffer unit.

The foot structure may further include a first valve provided in the link; and a first tube provided in the link and having one end portion communicating with the vacant space in the buffer unit and the other end portion connected to the first valve.

The foot structure may further include: a second valve provided in the link; and a second tube diverging from the first tube and having one end portion connected to the second valve.

At least a part of an outer surface of the buffer unit may include an elastic material.

At least a part of an outer surface of the buffer unit may have a groove portion.

In order to achieve the above-mentioned objects, a second aspect of the present disclosure provides a walking robot including a body part, and one or more foot structures coupled to a lower portion of the body part, in which the foot structure includes a link configured to define a body of the foot structure, a buffer unit coupled to one end portion of the link and having a vacant space formed in the buffer unit and filled with air, and a pressure sensor provided in the link and configured to detect a change in pressure of the air in the vacant space in the buffer unit.

In order to achieve the above-mentioned objects, a third aspect of the present disclosure provides a method of operating a walking robot including a body part and one or more foot structures coupled to a lower portion of the body part and further including a buffer unit provided at one end portion of the foot structure and having a vacant space formed therein, the method including a pneumatic pressure adjusting step of adjusting a pneumatic pressure in the buffer unit by introducing the air into the vacant space in the buffer unit or discharging the air from the vacant space between a first point in time at which the foot structure comes into contact with a ground surface and a second point in time at which the foot structure comes into contact with the ground surface again after the first point in time.

In the pneumatic pressure adjusting step, the pneumatic pressure in the buffer unit may be adjusted to the atmospheric pressure.

According to the present disclosure, it is possible to protect the pressure sensor mounted in the walking robot from external impact, thereby improving durability of the pressure sensor.

In addition, according to the present disclosure, it is possible to quickly remove the pressure difference when the pressure difference between the internal pressure and the external pressure of the foot structure, thereby ensuring constant performance despite the change in pressure.

DETAILED DESCRIPTION

Hereinafter, a foot structure for a walking robot, a walking robot, and a method of operating a walking robot according to the present disclosure will be described with reference to the drawings.

Foot Structure for Walking Robot

Figure 1:
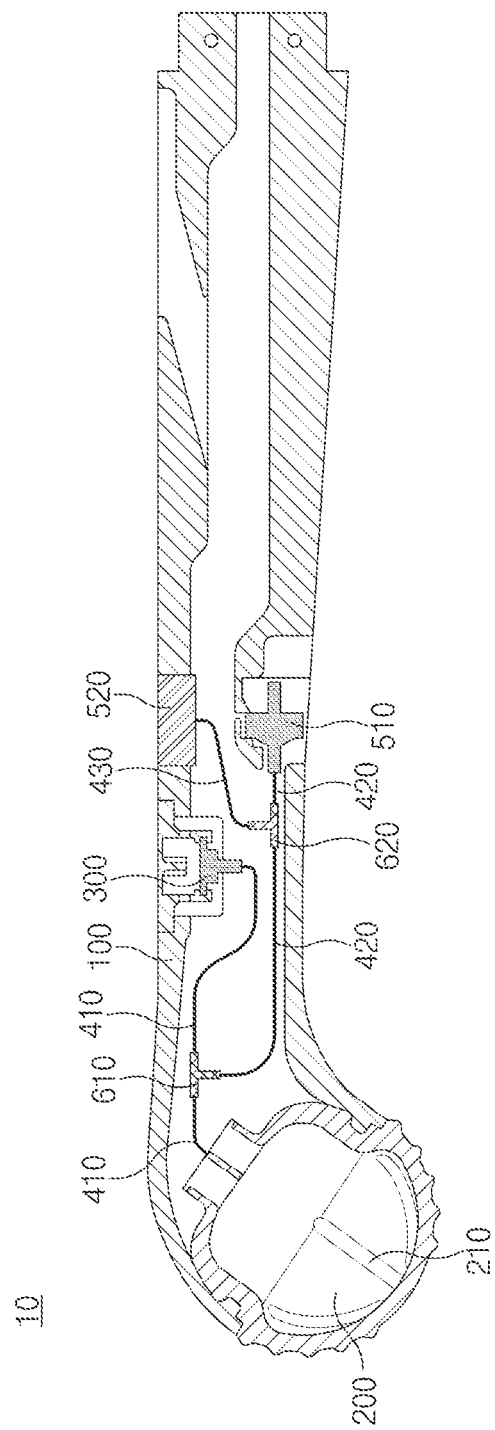
FIG. 1 is a cross-sectional view illustrating a structure of a foot structure for a walking robot according to an exemplary embodiment of the present disclosure.

FIG. 1 is a cross-sectional view illustrating a structure of a foot structure for a walking robot according to an exemplary embodiment of the present disclosure. The foot structure for a walking robot according to the present disclosure may be mounted in a walking robot to implement walking of the walking robot.

As illustrated in FIG. 1, the foot structure 10 for a walking robot (hereinafter, referred to as a 'foot structure') according to the present disclosure may include a link 100 configured to define a body of the foot structure, and a buffer unit 200 coupled to one end portion of the link 100. FIG. 1 illustrates a state in which the buffer unit 200 is inserted into and coupled to a left end portion of the link 100.

The buffer unit 200 may be a component provided at a lowermost side of the foot structure 10. Therefore, when the walking robot including the foot structure 10 walks, the buffer unit 200 may repeatedly come into contact with the ground surface or the object. That is, impact applied to the foot structure 10 may be transmitted from the outside by the buffer unit 200.

Therefore, the buffer unit 200 provided in the foot structure 10 according to the present disclosure may further include means for reducing impact which is applied to the foot structure 10 due to the contact between the buffer unit 200 and the ground surface or the object.

In more detail, according to the present disclosure, a vacant space may be formed in the buffer unit 200, and at least a part of an outer surface of the buffer unit 200 may include an elastic material. Therefore, the interior of the buffer unit 200 may be filled with air, and a shape of the buffer unit 200 may be reversibly deformed when the buffer unit 200 comes into contact with the ground surface or the object. As a result, the buffer unit 200 and the air in the buffer unit 200 may serve as a kind of buffer material.

Next, referring to FIG. 1, the foot structure 10 according to the present disclosure may further include a pressure sensor 300 provided in the link 100 and configured to detect a change in pressure of the air provided in the vacant space in the buffer unit 200.

As described above, when the buffer unit 200 comes into contact with the ground surface or the object, the shape of the buffer unit 200 may be deformed, and thus the air provided in the vacant space in the buffer unit 200 may also be compressed or expanded. Therefore, when the buffer unit 200 comes into contact with the ground surface or the object, the pressure of the air changes in the vacant space in the buffer unit 200. The pressure sensor 300 may be configured to detect the change in pressure to detect whether the buffer unit 200 is in contact with the ground surface or the object. Components in the link 100 will be described below in detail.

As illustrated in FIG. 1, the foot structure 10 according to the present disclosure may include a first tube 410 provided in the link 100 and communicating with the vacant space in the buffer unit 200. Therefore, the air in the vacant space in the buffer unit 200 may move to the first tube 410 in accordance with the change in pressure. On the contrary, the air in the first tube 410 may also move to the vacant space in the buffer unit 200.

In this case, according to the exemplary embodiment of the present disclosure, the pressure sensor 300 may be connected to one end portion of the first tube 410. In more detail, the pressure sensor 300 may be spaced apart from the buffer unit 200 in a longitudinal direction of the link 100, and the first tube 410 may communicate with the pressure sensor 300 and the vacant space in the buffer unit 200. Therefore, according to the exemplary embodiment of the present disclosure, the pressure sensor 300 may measure a pressure in the vacant space in the buffer unit 200 by means of the air introduced through the first tube 410, thereby determining not only whether the buffer unit 200 is in contact with the ground surface or the object, but also how strongly the buffer unit 200 is in contact with the ground surface or the object.

Next, referring to FIG. 1, according to the exemplary embodiment of the present disclosure, the foot structure 10 may further include a valve provided in the link 100. The valve may be configured to provide a path through which the air is supplied into the link 100 or the air in the link 100 is discharged to the outside.

The pressure of the air in the link 100, more particularly, the pressure of the air in the vacant space in the buffer unit 200 may vary depending not only on whether the buffer unit 200 is in contact with the ground surface or the object, but also on other factors. For example, when a temperature outside the foot structure 10 is increased or decreased or when the air leaks, the pressure of the air in the link 100 and the vacant space in the buffer unit 200 may be changed.

However, when the pressure of the air in the vacant space in the buffer unit 200 is changed due to other factors, it is impossible to appropriately measure the change in pressure in accordance with whether the buffer unit 200 is in contact with the ground surface or the object. Therefore, a means for preparing for the case in which the pressure in the buffer unit 200 is changed due to other factors needs to be provided.

The valve provided in the foot structure 10 according to the present disclosure may be a means for offsetting the change in pressure when the pressure of the air in the buffer unit 200 is changed due to other factors irrelevant to whether the buffer unit 200 is in contact with the ground surface or the object. In more detail, the valve may be a component that supplies the air into the link 100 from the outside or discharges the air from the link 100 to the outside to offset the change in pressure caused by other factors.

In more detail, referring to FIG. 1, the foot structure 10 according to the exemplary embodiment of the present disclosure may further include a first valve 510 provided in the link 100, and a second tube 420 diverging from the first tube 410 and having one end portion connected to the first valve 510. In more detail, the second tube 420 communicates with the first tube 410.

Meanwhile, the foot structure 10 according to the present disclosure may include the plurality of different valves. In more detail, as illustrated in FIG. 1, according to the exemplary embodiment of the present disclosure, the foot structure 10 may further include a second valve 520 provided in the link 100, and a third tube 430 diverging from the second tube 420 and having one end portion connected to the second valve 520.

Meanwhile, according to the present disclosure, the first valve 510 may be a check valve, and the second valve 520 may be an openable/closable bidirectional valve. In this case, the check valve may mean a valve that allows the air to flow only in one direction, and the openable/closable bidirectional valve may mean a valve that allows the air to flow in two directions.

In more detail, according to the present disclosure, the check valve, which is the first valve 510, is configured to allow the air to flow into the link 100 from the outside of the link 100 and prevent the air from flowing to the outside of the link 100 from the inside of the link 100. However, on the contrary, the first valve 510 may be configured to allow the air to flow to the outside of the link 100 from the inside of the link 100 and prevent the air from flowing into the link 100 from the outside of the link 100.

Meanwhile, unlike the check valve, the openable/closable bidirectional valve, which is the second valve 520, may be configured to enable the air to flow in the two directions between the outside of the link 100 and the inside of the link 100 by a difference in pressure between the inside and the outside of the link 100.

However, according to the present disclosure, the check valve may be configured to enable the air to flow into the link 100 from the outside of the link 100 through a flow path in the valve without a separate manipulation. In contrast, the openable/closable bidirectional valve may be configured to enable the air to flow in the two directions only when a flow path is opened by a separate manipulation. That is, in the case of the openable/closable bidirectional valve, the flow of the air between the inside and the outside of the link 100 may be blocked when the flow path in the valve is closed.

Meanwhile, as described above, the foot structure 10 according to the present disclosure may include a plurality of tubes, and a region in which any one tube diverges from another tube may be formed in a region in which the plurality of tubes meets together. In this case, according to the present disclosure, a component for connecting the tubes may be provided in the region in which any one tube diverges from another tube.

In more detail, as illustrated in FIG. 1, according to the exemplary embodiment of the present disclosure, the foot structure 10 may further include a first connection unit 610 provided in a region in which the second tube 420 diverges from the first tube 410, and the first connection unit 610 is provided to surround an outer portion of the first tube 410 and an outer portion of the second tube 420. In addition, according to the exemplary embodiment of the present disclosure, the foot structure 10 may further include a second connection unit 620 provided in a region in which the third tube 430 diverges from the second tube 420, and the second connection unit 620 is provided to surround the outer portion of the second tube 420 and an outer portion of the third tube 430. The first connection unit 610 and the second connection unit 620 may serve to connect the tubes to guide the flow of the air and may also serve to protect the tubes. For example, the first connection unit 610 and the second connection unit 620 may be made of the same material as the tubes 410, 420, and 430. However, on the contrary, the first connection unit 610 and the second connection unit 620 may be made of a material different from a material of the tubes 410, 420, and 430.

Next, referring to FIG. 1, according to the exemplary embodiment of the present disclosure, a length of the first tube 410 within a region between the first connection unit 610 and the pressure sensor 300 may be shorter than a length of the second tube 420 within a region between the first connection unit 610 and the first valve 510. In this case, the pressure sensor 300 may more quickly detect the change in pressure of the air in the vacant space in the buffer unit 200.

In addition, according to the exemplary embodiment of the present disclosure, a length of the second tube 420 within a region between the second connection unit 620 and the first valve 510 may be shorter than a length of the third tube 430 within a region between the second connection unit 620 and the second valve 520. Therefore, when the pressure of the air in the vacant space in the buffer unit 200 is changed due to factors other than the contact between the buffer unit 200 and the ground surface or the object, the first valve 510 may more quickly cope with the change in pressure than the second valve 520.

Figure 2:
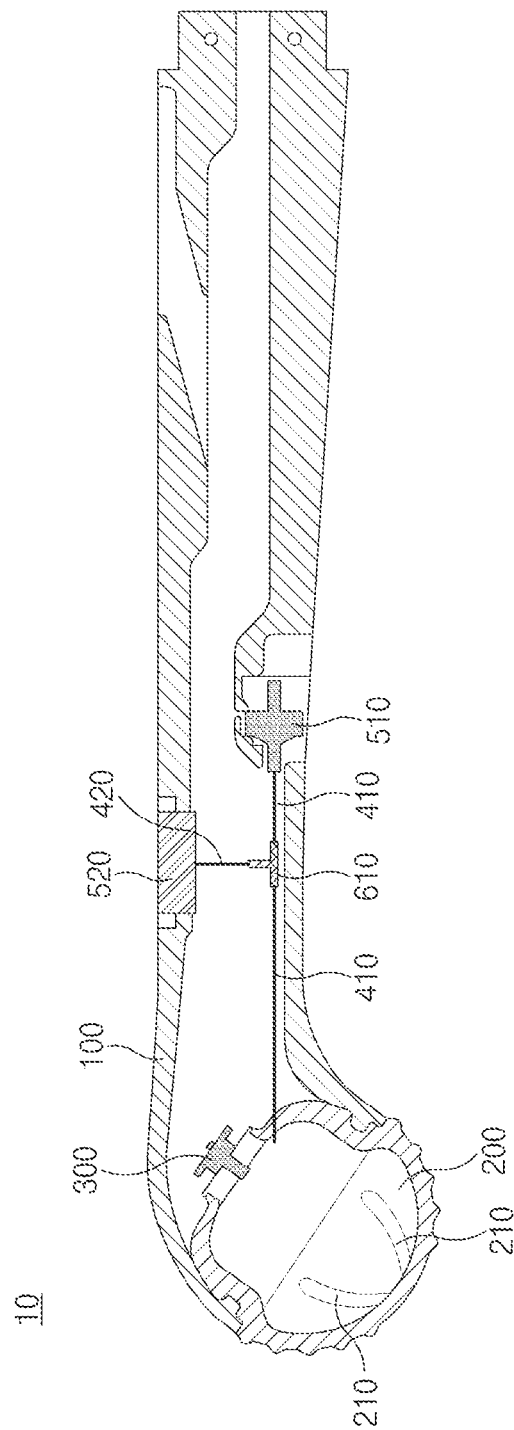
FIG. 2 is a cross-sectional view illustrating a structure of a foot structure for a walking robot according to another exemplary embodiment of the present disclosure.

FIG. 2 is a cross-sectional view illustrating a structure of a foot structure for a walking robot according to another exemplary embodiment of the present disclosure.

Referring to FIG. 2, unlike the above-mentioned exemplary embodiment of the present disclosure, the foot structure 10 according to another exemplary embodiment of the present disclosure is configured such that the pressure sensor 300 may be inserted and coupled directly into the buffer unit 200. In this case, the pressure sensor 300 may more quickly detect the change in pressure when the pressure in the vacant space in the buffer unit 200 is changed.

Additionally, the foot structure 10 may include the first valve 510 provided in the link 100, and the first tube 410 provided in the link 100 and having one end portion communicating with the vacant space in the buffer unit 200 and the other end portion connected to the first valve 510. Therefore, unlike the above-mentioned exemplary embodiment of the present disclosure, the first tube 410 according to another exemplary embodiment of the present disclosure may be connected to the first valve 510 without being connected to the pressure sensor 300.

In addition, according to another exemplary embodiment of the present disclosure, the foot structure 10 may further include the second valve 520 provided in the link 100, and the second tube 420 diverging from the first tube 410 and having one end portion connected to the second valve 520. In this case, the first connection unit 610 provided to surround the outer portion of the first tube 410 and the outer portion of the second tube 420 may be provided in the region in which the second tube 420 diverges from the first tube 410.

Meanwhile, similar to the above-mentioned exemplary embodiment of the present disclosure, the first valve 510 may be a check valve, and the second valve 520 may be an openable/closable bidirectional valve.

In this case, as illustrated in FIG. 2, according to another exemplary embodiment of the present disclosure, the entire region of the first tube 410 for connecting the buffer unit 200 and the first valve 510 may have a rectilinear structure. In this case, a length of the first tube 410 may be minimized, and the first tube 410 has no curved region, such that a response speed of the first valve 410 may be improved when the pressure in the vacant space in the buffer unit 200 is changed. Furthermore, in the case in which the entire region of the first tube 410 has a rectilinear structure, the first tube 410 may be made of a hard material instead of a flexible material, such that there is also an advantage in terms of durability of the first tube 410.

Meanwhile, referring to FIGS. 1 and 2, at least a part of an outer surface of the buffer unit 200 provided in the foot structure 10 according to the present disclosure may have a groove portion 210 having a recessed shape. The groove portion 210 may serve not only to increase frictional force on the surface of the buffer unit 200 to prevent the buffer unit 200 from slipping from the ground surface, but also to enable the buffer unit 200 to be smoothly inserted into the link 100. However, unlike the configurations illustrated in FIGS. 1 and 2, at least a part of the outer surface of the buffer unit 200 may have a protrusion having a protruding shape. For example, the plurality of protrusions may be provided. For example, the plurality of protrusions may have concentrically circular structures having different sizes.

Walking Robot

The walking robot according to the present disclosure may include a body part (not illustrated) configured to define a body of the walking robot, and the one or more foot structures 10 connected to a lower portion of the body part and extending downward. In this case, the foot structure 10 may include the link 100 configured to define a body of the foot structure 10, the buffer unit 200 connected to one end portion of the link 100 and having the vacant space formed in the buffer unit 200 and filled with the air, and the pressure sensor 300 provided in the link 100 and configured to detect the change in pressure of the air in the vacant space in the buffer unit 200.

Method of Operating Walking Robot

A method of operating a walking robot according to the present disclosure may be a method of operating the walking robot including the body part configured to define the body of the walking robot, the one or more foot structures 10 coupled to the lower portion of the body part and extending downward, and the buffer unit 200 provided at one end portion of the foot structure 10 and having the vacant space formed therein.

In this case, the method of operating the walking robot according to the present disclosure may include a pneumatic pressure adjusting step of adjusting a pneumatic pressure in the buffer unit 200 by introducing the air into the vacant space in the buffer unit 200 or discharging the air from the vacant space between a first point in time at which the foot structure 10 comes into contact with the ground surface and a second point in time at which the foot structure 10 comes into contact with the ground surface again after the first point in time. In this case, in the pneumatic pressure adjusting step, the pneumatic pressure in the buffer unit 200 may be adjusted to the atmospheric pressure. In more detail, the pneumatic pressure adjusting step may be performed by opening the flow path of the second valve 520 which is the openable/closable bidirectional valve. The flow path of the second valve 520 may be automatically opened or manually opened.

The present disclosure has been described with reference to the limited exemplary embodiments and the drawings, but the present disclosure is not limited thereto. The described exemplary embodiments may be carried out in various forms by those skilled in the art to which the present disclosure pertains within the technical spirit of the present disclosure and within the scope equivalent to the appended claims.

The invention claimed is:

1. A foot structure for a walking robot, the foot structure comprising:
    a link defining a body;
    a buffer unit coupled to one end portion of the link and having a vacant space formed therein; and
    a pressure sensor positioned in the link, the pressure sensor being configured to detect a change in pressure of air in the vacant space in the buffer unit;
    a first tube positioned in the link and communicating with the vacant space in the buffer unit, wherein the pressure sensor is connected to one end portion of the first tube;
    a first valve positioned in the link; and
    a second tube diverging from the first tube, the second tube having one end portion connected to the first valve.

2. The foot structure of claim 1, further comprising:
    a second valve positioned in the link; and
    a third tube diverging from the second tube, the third tube having one end portion connected to the second valve.

3. The foot structure of claim 2, further comprising:
    a second connection unit positioned in a region in which the third tube diverges from the second tube, wherein the second connection unit is positioned to surround the outer portion of the second tube and an outer portion of the third tube.

4. The foot structure of claim 3, wherein a length of the second tube within a region between the second connection unit and the first valve is shorter than a length of the third tube within a region between the second connection unit and the second valve.

5. The foot structure of claim 2, wherein the second valve is a bidirectional valve.

6. The foot structure of claim 1, further comprising:
    a first connection unit positioned in a region in which the second tube diverges from the first tube, wherein the first connection unit is positioned to surround an outer portion of the first tube and an outer portion of the second tube.

7. The foot structure of claim 6, wherein a length of the first tube within a region between the first connection unit and the pressure sensor is shorter than a length of the second tube within a region between the first connection unit and the first valve.

8. The foot structure of claim 1 wherein the first valve is a check valve.

9. The foot structure of claim 8, wherein the check valve allows the air to flow into the link from the outside of the link, and prevents the air from flowing to the outside of the link from the inside of the link.

10. The foot structure of claim 1, wherein the pressure sensor is inserted and coupled into the buffer unit.

11. The foot structure of claim 1, wherein at least a part of an outer surface of the buffer unit comprises an elastic material.

12. The foot structure of claim 1, wherein at least a part of an outer surface of the buffer unit has a groove portion.

13. The A foot structure for a walking robot, the foot structure comprising:
a link defining a body;
a buffer unit coupled to one end portion of the link and having a vacant space formed therein; and
a pressure sensor positioned in the link, inserted and coupled into the buffer unit, the pressure sensor being configured to detect a change in pressure of the air in the vacant space in the buffer unit;
a first valve positioned in the link; and
a first tube positioned in the link, the first tube having one end portion communicating with the vacant space in the buffer unit and an other end portion connected to the first valve.

14. The foot structure of claim 13, further comprising:
a second valve positioned in the link; and
a second tube diverging from the first tube, the second tube having one end portion connected to the second valve.

15. A method of operating a walking robot comprising a body part and one or more foot structures coupled to a lower portion of the body part, and further comprising a buffer unit provided at one end portion of the foot structure and having a vacant space formed therein, the method comprising:
adjusting a pneumatic pressure in the buffer unit by introducing the air into the vacant space in the buffer unit or discharging the air from the vacant space between a first point in time at which the foot structure comes into contact with a ground surface, and a second point in time at which the foot structure comes into contact with the ground surface again after the first point in time.

16. The method of claim 15, wherein the pneumatic pressure in the buffer unit is adjusted to atmospheric pressure.

* * * * *